July 13, 1965  W. B. MORRIS ETAL  3,194,517
COCKPIT ENCLOSURE AND OPERATING MECHANISM
Filed Dec. 20, 1963  3 Sheets-Sheet 1
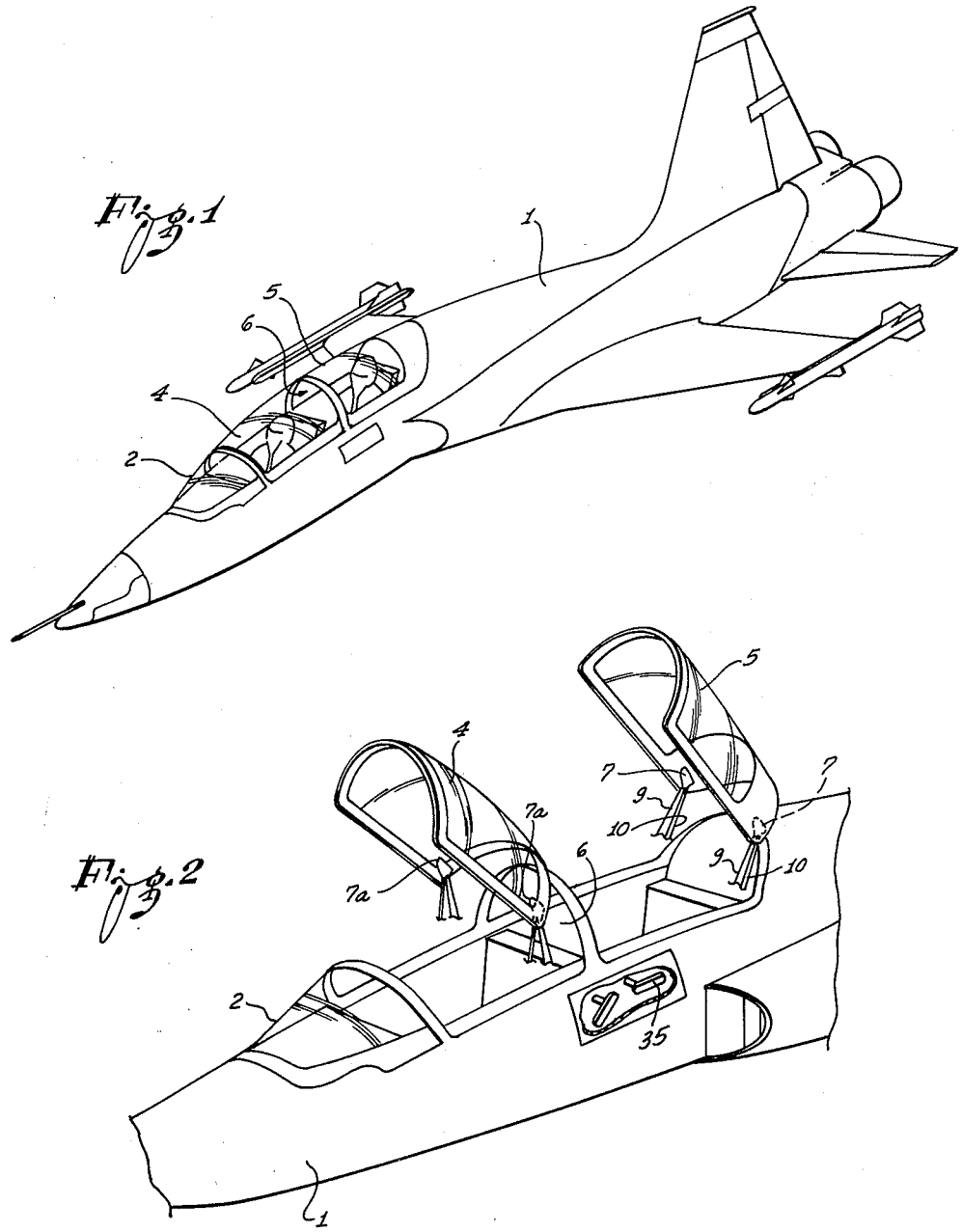
INVENTORS:
Willis B. Morris
Robert M. Kubow
Agent

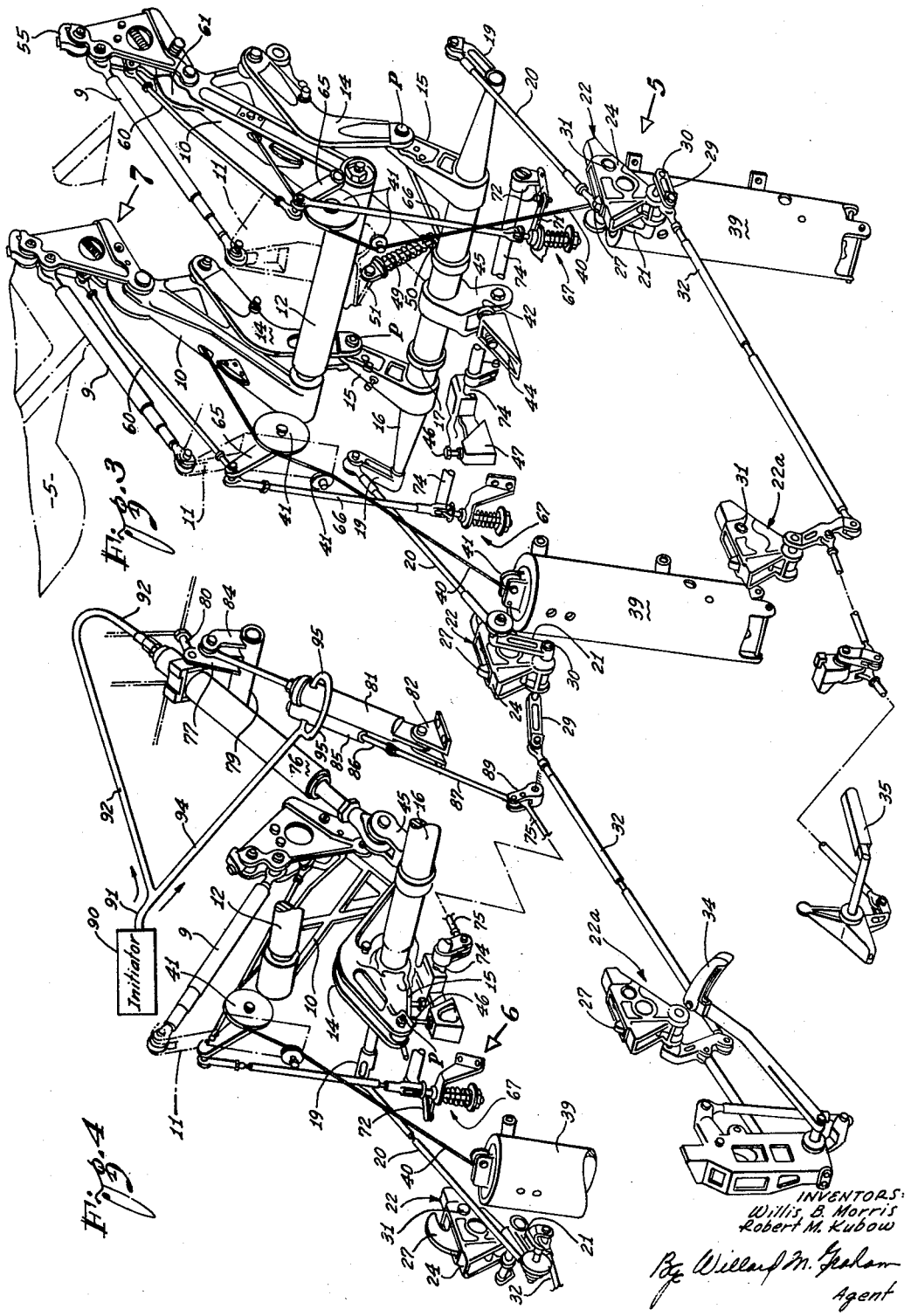

July 13, 1965  W. B. MORRIS ETAL  3,194,517
COCKPIT ENCLOSURE AND OPERATING MECHANISM
Filed Dec. 20, 1963  3 Sheets-Sheet 3
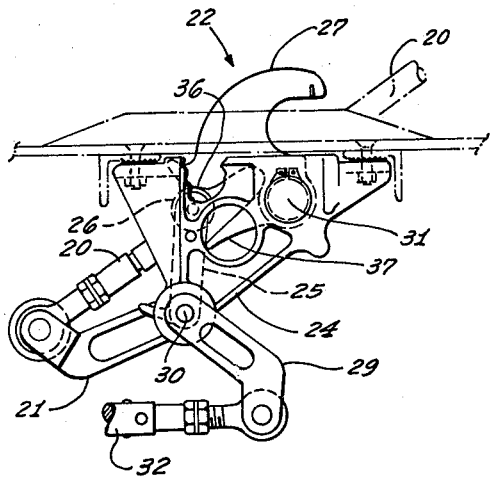
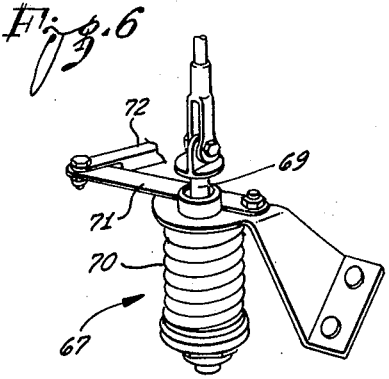
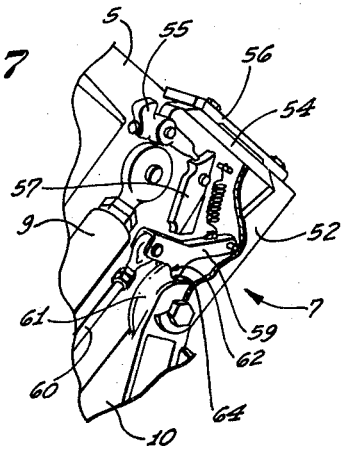
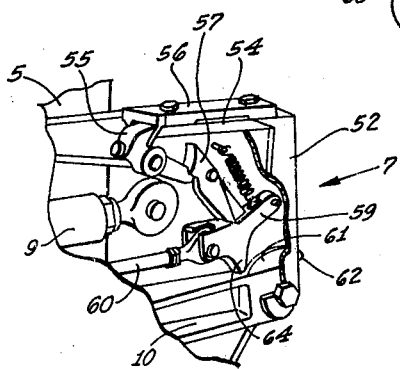
INVENTORS:
Willis B. Morris
Robert M. Kubow
By William M. Graham
Agent United States Patent Office 3,194,517
Patented July 13, 1965

3,194,517
COCKPIT ENCLOSURE AND OPERATING
MECHANISM
Willis B. Morris, Redondo Beach, and Robert M. Kubow,
Manhattan Beach, Calif., assignors to Northrop Corporation, Beverly Hills, Calif., a corporation of
California
Filed Dec. 20, 1963, Ser. No. 332,088
13 Claims. (Cl. 244—121)

The present invention relates to aircraft, and more particularly, to cockpit canopies and associated operating mechanism for supersonic airplanes.

With small and light-weight airplanes, cockpit enclosures for one or two pilots are relatively easy to provide and manually operate. With larger airplanes, such canopies generally became too complex and heavy for manual operation, so that power-operated mechanisms were designed. These latter, however, have been accompanied by several disadvantages, such as excessive complexity and weight, decreased reliability and safety factors, the lack of desirable operational functions, and the like, especially in high performance aircraft where efficiency is essential and where the canopy must be able to be locked and unlocked, closed and opened, and jettisoned, all in a simple manner.

It is therefore an object of this invention to provide a cockpit canopy and operating mechanism having no power-moving actuators but which is easily manually opened and closed even though the canopy may weigh up to 100 or 200 pounds for example.

A further object is to provide such a canopy which is balanced in all positions from open to closed, without the use of weights.

In tandem-seat aircraft, it may be necessary or desirable to eject the canopy covering both or only one of the two crew positions, for example. The front cockpit of airplanes having conventional canopy arrangements is usually protected from the air stream by the forward windshield even when the canopy is jettisoned. However, if the canopy covering both crew positions is jettisoned, or even if a front one only is jettisoned, the rear-seat man has little protection. Another object of our invention is to provide means by which the back-seat man is protected if the front canopy, only, is jettisoned, or even to an appreciable extent if both canopies are jettisoned.

Further objects and features of advantage will become apparent upon reading the detailed description of a specific embodiment of this invention to follow, but it is to be understood that the invention is not limited to the specific construction disclosed herein by way of illustration only.

Briefly, our invention comprises a curved canopy structure having each rear lower side thereof connected to a special type of four-bar linkage which is in turn connected to the cockpit structure so that the canopy rotates up and open at the forward end when the linkage is operated, the rear end being elevated substantially also. A pair of counter-balance spring assemblies are connected by cable to the linkage to balance the overall canopy weight and moments at all intermediate and extreme positions. An actuating linkage, operated by an internal hand crank or lever, functions to lock and unlock the canopy when in the closed position, and raise and lower the canopy, all in one continuous motion. In both the fully closed and opened positions, the actuating linkage goes "over center" to hold the canopy against reversely directed loads. The canopy structure itself is fastened to the outer end of the four-bar linkage by novel attachment means serving as disconnect points when the canopy is to be removed, adjusted, or jettisoned. Other features include a thruster for jettisoning, a hydraulic damper for controlling rate of operation, and an external handle for canopy operation similar to that controlled internally of the aircraft.

The present invention is applied to two closely adjacent tandem cockpits, and the two canopy installations are substantially identical in function but with different linkage end points so that no interference between front and rear canopy opening paths exists and so that both canopies come into their closed positions from the proper direction to mate satisfactorily with fixed bulkheads and/or windshield in the aircraft fuselage. A separate, transparent windshield is fixed to the aircraft structure between the two canopies.

Our invention may be more fully understood by reference to the following detailed description of a specific embodiment, in conjunction with the accompanying illustrative drawings, wherein:

FIGURE 1 is a perspective view of an airplane showing the present invention embodied in two tandem cockpit canopies thereof.

FIGURE 2 is a perspective view of the cockpit area of FIGURE 1 on an enlarged scale, showing the canopies opened.

FIGURE 3 is a perspective diagram showing the aft canopy drive mechanism in the open position.

FIGURE 4 is a perspective diagram showing the major portion of the same mechanism as in FIGURE 3, but in the closed position.

FIGURE 5 is an elevation view of one canopy lock assembly, viewed as indicated by the numeral 5 in FIGURE 3 but showing the lock assembly in locked position.

FIGURE 6 is an enlarged perspective view of a latch drive spring assembly, viewed as indicated by the numeral 6 in FIGURE 4.

FIGURE 7 is a perspective detail of a latch hinge disconnect mechanism shown in the open position, viewed as indicated by the numeral 7 in FIGURE 3.

FIGURE 8 is a perspective detail of the disconnect mechanism of FIGURE 7, shown in the closed position.

Referring first to FIGURE 1 for a detailed description of specific apparatus, a two-place supersonic airplane 1 is provided with a forward windshield 2 which may be rigidly fixed to the airplane fuselage or may be hinged at its forward edge to permit access for maintenance purposes. Just back of the windshield 2 is a forward canopy 4 covering a forward crew seat and then a rear canopy 5 over a rear crew position. Both these canopies 4 and 5 are openable and removable as will be described later, and a fixed windshield 6 is fastened to the fuselage between them.

In FIGURE 2, canopies 4 and 5 are shown in their open positions. A pair of latch-hinge disconnect assemblies 7 and 7a supports the lower rear corners of each canopy. A tension rod 9 and a torque arm 10 are pivoted at their upper ends to each disconnect assembly 7 and pivoted at their lower ends to fixed axes and operating mechanism in the aircraft cockpits. Each canopy is independently operated by its own mechanism, which mechanisms are similar but not identical.

The operating mechanism for the rear canopy 5 is typical, and is shown in FIGURE 3 in its open position. Here, it will be seen that the two tension rods 9 are rotatably connected to respective fixed brackets 11, and the two torque arms 10 are rotatably mounted on opposite ends of a fixed shaft 12 mounted laterally across the rear of the cockpit. The structure in which this shaft is mounted is omitted for the sake of clarity. Shaft 12 may be omitted from an actual installation, retaining only end mounting means for the arms 10.

The geometry of the tension rod and torque arm and their connection points determine the specific four-bar linkage which governs the motion of each canopy. The canopy structure between the upper ends of the tension rod and torque arm forms the upper link of the four-bar linkage, and the airplane structure between the lower ends thereof forms the lower link. When the tension rods 9 and the torque arms 10 are rotated clockwise from the left side, it is seen that the canopy will be lowered from its open position shown in FIGURE 3 and allowed to rotate down at its forward end to a closed position.

To drive the canopy, a curved link 14 is pivotally connected between each torque arm 10 and the outer end of one of two actuating arms 15 fixed to an actuating shaft 16 which is rotatable in bearings 17 (one of which is shown) fixed to the airplane. In the open position shown in FIGURE 3, the connection point P between each actuating arm 15 and its curved link 14 is slightly below a line joining the end points of these two elements, thus forming an over-center position. In the closed position shown in FIGURE 4, the actuating shaft 16 has been rotated counter-clockwise to where the point P is now forward of this shaft and again slightly below the line joining the center of actuating shaft 16 and the rear end of link 14.

Continuing with the drive mechanism as shown in FIGURE 3, a lever arm 19 is attached to each end of actuating shaft 16, and a side operating rod 20 is pivotally connected to it and extends forward to pivotally connect to a first crank 21 of a lock assembly 22 further comprising a fixed support 24, a lock lever 25 (FIGURE 5) with end roller 26, a hook 27, and a second crank 29. The cranks 21 and 29 and lock lever 25 are integrally rotatable on a support axis 30, while hook 27 is rotatable about a further support pin 31.

A push-pull rod 32 connects from second crank 29 forward on each side of airplane 1 to another lock assembly 22a, which is similarly connected forward to an interior pilot-operated control handle 34 on the right-hand side, and to an exterior handle 35 on the left-hand side. Either handle, when manually operated approximately 110 degrees, will open and close the canopy 5, including unlocking and locking.

FIGURE 5 illustrates how the end roller 26 bears against a locking surface 36 of hook 27 to insure maintaining the hook 27 closed. Further, it is seen that the first opening motion of handle 34 or 35 will rotate roller 26 rearwardly and engage a lip 37 on hook 27 to unlock the latter, the roller 26 having ample further motion to enable complete opening of the canopy 5. The hooks 27 engage pins or rollers (not shown) in the canopy edge structure in a conventional manner, and thus this structure need not be described.

Returning again to FIGURES 3 and 4, a pair of spring balance assemblies 39 is provided, one on each side of the canopy mechanism. A cable 40 is under tension from an internal spring (not shown) and proceeds over idler pulleys 41 to fasten to the upper side of each torque arm 10. The spring balance assemblies 39 furnish enough pull to balance the canopy 5 throughout its entire range so that it is easily manually operated. As the canopy closes, the cables 40 are pulled out to increase the spring force as required for the greater canopy moment of force to be overcome at and near the closed position.

To define the exact open position of the canopy and mechanism, an "open" stop-bolt 42 mounted in a fixed frame 44 abuts a horn member 45 secured to the actuating shaft 16. To define the closed canopy position, a "closed" stop-bolt 46 also mounted on fixed structure 47, abuts the outer end of one of the actuating arms 15.

An over-center spring 49 is pivotally connected at its lower end to a short leg 50 fastened near the center of the actuating shaft 16, and pivotally connected at its upper end to a fixed lug 51. In both the open and closed canopy positions, it is seen that the over-center spring 49 is bearing on the leg 50 in the proper direction and position to hold the canopy against the stop-bolt 42 or 46 and react against reverse loads on the canopy to a predetermined extent.

The canopy disconnecting means will now be described. As mentioned before, the latch-hinge disconnect assemblies 7 support the canopy 5. Referring now especially to FIGURES 7 and 8, each said disconnect assembly 7 comprises a generally triangular shaped housing 52 which is normally held to an attach plate 54 by a latch disconnect hook 55 rotatably mounted in the housing 52. The plate 54 is bolted to a canopy attach bracket 56 which is in turn secured to the canopy 5 structure by bolts for example. A pivotally mounted latch disconnect lever 57 and a pivotally mounted latch disconnect pawl 59 are also provided in the housing 52, related as shown in FIGURES 7 and 8. The pawl 59 is spring-loaded toward the lever 57 and has a linkage drive rod 60 pivotally connected thereto. Further, the torque arm 10 carries an integral curved cam 61 having a release surface 62 thereon, and a follower projection 64 on the disconnect pawl 59 rides on the cam 61.

In operation when the canopy 5 is closed as shown in FIGURE 8, the latch disconnect elements are locked together as shown, so that the disconnect hook 55 is closed over the forward end of the attach plate 54, thus holding the canopy attached to the disconnect assembly 7 and thereby to the airplane. It will be noted that pawl 59 cannot be released from disconnect lever 57 since projection 64 is held on top of cam 61. When the canopy 5 reaches its open position (FIGURE 7), projection 64 is beyond cam release surface 62, but spring-loaded pawl 59 still normally retains the lever 57 and hook 55 locked or closed. However, if now the drive rod 60 is pulled, it will rotate pawl 59 downwardly against its spring load to the position shown in FIGURE 7, thus allowing lever 57 to release hook 55. Canopy 5 may now be tipped rearwardly and lifted off, or may be jettisoned as will be described later.

The forward end of each linkage drive rod 60 is pivotally connected to an idler crank 65 which is pivotally mounted on the respective fixed bracket 11. A lower drive rod 66 is also pivotally connected to the crank 65 in driving relation to the linkage drive rod 60, and lower drive rod 66 connects to a latch drive spring assembly 67 which normally holds the entire latch linkage in locked or attached position and prevents the lower drive rod 66 from being pulled downwardly to release the canopy 5.

Each drive spring assembly 67, one of which is shown in detail in FIGURE 6, includes a spring plunger 69 normally urged downwardly by a latch drive spring 70. However, plunger 69 carries a transverse slot (not shown) into which fits an edge of a release arm 71 to hold plunger 69 in its upper position until such time as release arm 71 is pivoted out of the slot. A pull member 72 operatively connected to release arm 71 is operated by a jettison torque tube 74 which is driven by a jettison rod 75 when the canopy 5 is jettisoned as will next be described.

As shown most clearly in FIGURE 4, the main actuating member of the canopy jettison system is a thruster 76 which comprises an extendable rod in a cylindrical body. The rod end of thruster 76 is pivotally connected to the horn member 45 fixed to the canopy actuating shaft 16 so that when thruster 76 is extended, the actuating shaft 16 will be driven clockwise and open the canopy as described before. The cylinder end of thruster 76 is pivotally connected to a radial extension 77 of a jettison cylinder support tube 79 rotatable on a fixed axis in the aircraft frame. In the closed canopy position illustrated in FIGURE 4, the extension 77 is almost, but not quite, bottomed against a thruster stop-bolt 80. A small clearance (not shown) is left at this end of thruster travel when the canopy is closed and the thruster 76 is in its retracted position for all normal canopy operation.

A hydraulic damper 81 is also involved in the jettison system, and is pivotally connected at its lower end to a fixed end fitting 82 and pivotally connected at its upper end to a clevis 84 secured to the support tube 79. Damper 81 also includes an auxiliary cylinder 85 which is preferably an integral part of damper 81 as shown. Auxiliary cylinder 85 has a retractible piston rod 86 which is pivotally connected by a jointed axial drive link 87 to an idler lever 89 rotatable on a fixed structural axis. The jettison rod 75 is also pivotally connected to idler lever 89 so that when the piston rod 86 is retracted, jettison rod 75 is pulled rearwardly.

To put the jettison system into operation, an initiator 90 is provided. This initiator 90 may be fired by any suitable desired means (not shown) in the airplane, this latter means being conventional and not part of the present invention.

An outlet duct 91 from initiator 90 delivers hot gas through a thruster hose 92 to actuate thruster 76 rapidly to its extended position to open the canopy 5. Hot gas is also delivered to an auxiliary cylinder inlet hose 94 where it overcomes internal spring pressure and retracts piston rod 86, thus rotating jettison torque tube 74 counterclockwise and pulling release arm 71 to allow latch drive spring 70 to pull downwardly on lower drive rod 66. As described previously, this action will unlock the latch disconnect hook 55 when the canopy reaches the open position and let the canopy go free of the airplane.

During normal opening and closing of the canopy, the thruster 76 merely acts as a solid rod and drives the damper 81 in and out. This is due to an internal locking sleeve (not shown) which does not break loose until the thruster is fired. The damper 81 thus acts as a rate limiter on the canopy mechanism to prevent high speed operation from building up excessive loads on the drive mechanism.

The damper 81 does not operate on the canopy mechanism during jettisoning of the canopy by the initiator 90. However, if the canopy is manually opened at or above a predetermined airspeed, 60 miles per hour for example, the canopy will be automatically released as follows: the damper 81 will be forced by air load on the open canopy at such a high rate as to open a relief valve therein and port hydraulic fluid under pressure therefrom through an emergency line 95 to the auxiliary cylinder inlet hose 94, where this hydraulic fluid will act to retract the piston rod 86 the same as if the initiator 90 had been operated. Thus, the latch-hinge disconnects 7 will open and allow the canopy to be released under these conditions.

It is seen that this provision allows the pilot to open the canopy 5 for any reason at a reasonable taxi speed without the disconnect members being operated, but above a certain load on the open canopy caused by too high a relative air-speed, it is assumed that when the pilot opens his canopy he wants to eject it, and the above provisions will overload the damper relief valve and automatically cause the canopy to be disconnected from the airplane as soon as it reaches its opened position.

In a high altitude airplane such as herein depicted, a canopy seal system is usually incorporated to render the cockpits air tight for pressurization purposes. It is a routine matter to incorporate inflation actuation means into the canopy handle mechanism to inflate the canopy seals when the canopy is closed and locked.

It is thus seen that the present invention fulfills all the enumerated objects stated herein, and that this canopy mechanism can be applied to any reasonable sized canopy. Although the particular canopy which is on the aircraft shown herein weighs only approximately 75 pounds, it might weigh between 100 and 200 pounds while still employing essentially the same mechanism. For canopies over about 200 pounds, it would be desirable to use proportionally stronger members and change the mechanical advantage to increase the length of travel of the manual control handles so that the greater inertia of a much heavier canopy could be easily overcome.

While in order to comply with the statute, the invention has been described in language more or less specific as to structural features, it is to be understood that the invention is not limited to the specific features shown, but that the method and means herein disclosed comprise a preferred form of putting the invention into effect, and the invention is therefore claimed in any of its forms or modifications within the legitimate and valid scope of the appended claims.

What is claimed is:

1. In an airplane or the like having a movable cockpit canopy, an operating mechanism for said canopy comprising: means for connecting said mechanism to each lower rear corner of said canopy; a pair of link members having their outer ends rotatably connected to each said connecting means at fore-and-aft spaced points thereon and having their inner ends rotatably connected to fixed airplane structure at fore-and-aft spaced points thereon; said link members forming, with said connecting means and said airplane structure, a pair of four-bar linkages such that said canopy moves upwardly and rotates rearwardly open when said linkage is operated from a closed canopy position; elastic counter-balance means connected between both said linkages and said airplane to balance the weight of said canopy and mechanism throughout its range of positions; and manually operated linkage actuating means connected to both said linkages for opening and closing said canopy.

2. Apparatus in accordance with claim 1 wherein two such canopies and mechanisms are provided over two tandem crew positions in said airplane, the rear of the forward canopy being closely adjacent the front of the rear canopy when in their closed positions, and including a fixed windshield on said airplane between said canopies.

3. Apparatus in accordance with claim 1 wherein said canopy is of generally semi-cylindrical shape open at both ends.

4. Apparatus in accordance with claim 1 wherein each said connecting means comprises a disconnect assembly releasably mounted to said canopy, and release means connected to said disconnect assemblies to release said canopy from said disconnect assemblies.

5. Apparatus in accordance with claim 4 including means preventing said release means from being operable except in the open position of said canopy.

6. Apparatus in accordance with claim 1 including rotatable canopy lock means in said airplane positioned to lockingly engage the lower edges of said canopy when closed, and motion transmitting means connecting said actuating means to said lock means, said motion transmitting means having over-travel means so that said lock means is unlocked with initial travel of said actuating means and remains unlocked during further travel of said actuating means in opening said canopy.

7. Apparatus in accordance with claim 1 wherein said linkage actuating means comprises a single rotatable actuating shaft mounted laterally across said airplane; a radial actuating arm fixed to said shaft toward each end thereof; a curved link rotatably connected at one end thereof to the outer end of each said arm, respectively, the other end of each said curved link being rotatably connected to each of one of said pair of link members, respectively; the opposite end connection points of each of said curved links being in essentially a straight line with the center of rotation of its respective actuating arm when said canopy is in both its open and closed positions; mechanical stop means operating between the fixed structure of said airplane and said actuating means to limit the closed and open positions of said canopy where the outer end connection point of each said actuating arm is just beyond the straight-line positions defined above in both extremes of travel; a manually operated handle mounted convenient to an occupant of said airplane; and motion transmitting means operatively connected between said handle and said actuating shaft.

8. Apparatus in accordance with claim 7 including a short lever arm fixed to said actuating shaft, and an over-center compression spring assembly connected at one end thereof to fixed airplane structure, the other end thereof being pivotally connected to said lever arm, said spring assembly making substantially equal angles with said lever arm in both said open and closed canopy positions and acting in the direction to maintain said actuating means in both said open and closed positions.

9. Apparatus in accordance with claim 4 including power-operated jettison means operatively connected to said linkage actuating means and to said release means to open said canopy and release it from said airplane when energized.

10. Apparatus in accordance with claim 1 including damping means operatively connected to said linkage actuating means to restrict rapid movement of said canopy.

11. Apparatus in accordance with claim 4 including damping means operatively connected to said actuating means to restrict rapid movement of said canopy, power operated release actuating means operatively connected to said release means, said latter actuating means being responsive to a predetermined high load on said damping means to automatically actuate said release means when said canopy is opened at a great enough airplane speed to cause said predetermined damper load.

12. Apparatus in accordance with claim 4 including power-operated jettison means comprising a piston and cylinder combination in a normally retracted position, one end of said combination being operatively connected to said linkage actuating means in the direction to tend to open said canopy when said combination is extended for jettison operation; mechanical stop means in blocking relation with the other end of said combination when said canopy is closed to provide a rigid back-up thereon when said jettison means is extended; a damper assembly having two relatively movable elements, one of said elements pivotally connected to fixed airplane structure; and pivotal means connecting said other damper element to said other end of said piston and cylinder combination, whereby said jettison means and said damper assembly are effectively connected in series between said linkage actuating means and said airplane structure.

13. Apparatus in accordance with claim 12 wherein said jettison means further includes initiator means connected to fire said piston and cylinder combination for extension thereof, and opearting means connected from said initiator to said release means to operate the latter in parallel with said piston and cylinder combination.

References Cited by the Examiner
UNITED STATES PATENTS

| | | | |
|---|---|---|---|
| 2,828,093 | 3/58 | Kaplan | 244—121 |
| 2,828,094 | 3/58 | Hildebrand | 244—121 |
| 2,970,793 | 2/61 | Beem et al. | 244—121 |
| 2,998,212 | 8/61 | Rogers | 244—121 |

FERGUS S. MIDDLETON, *Primary Examiner.*